Figure 1:
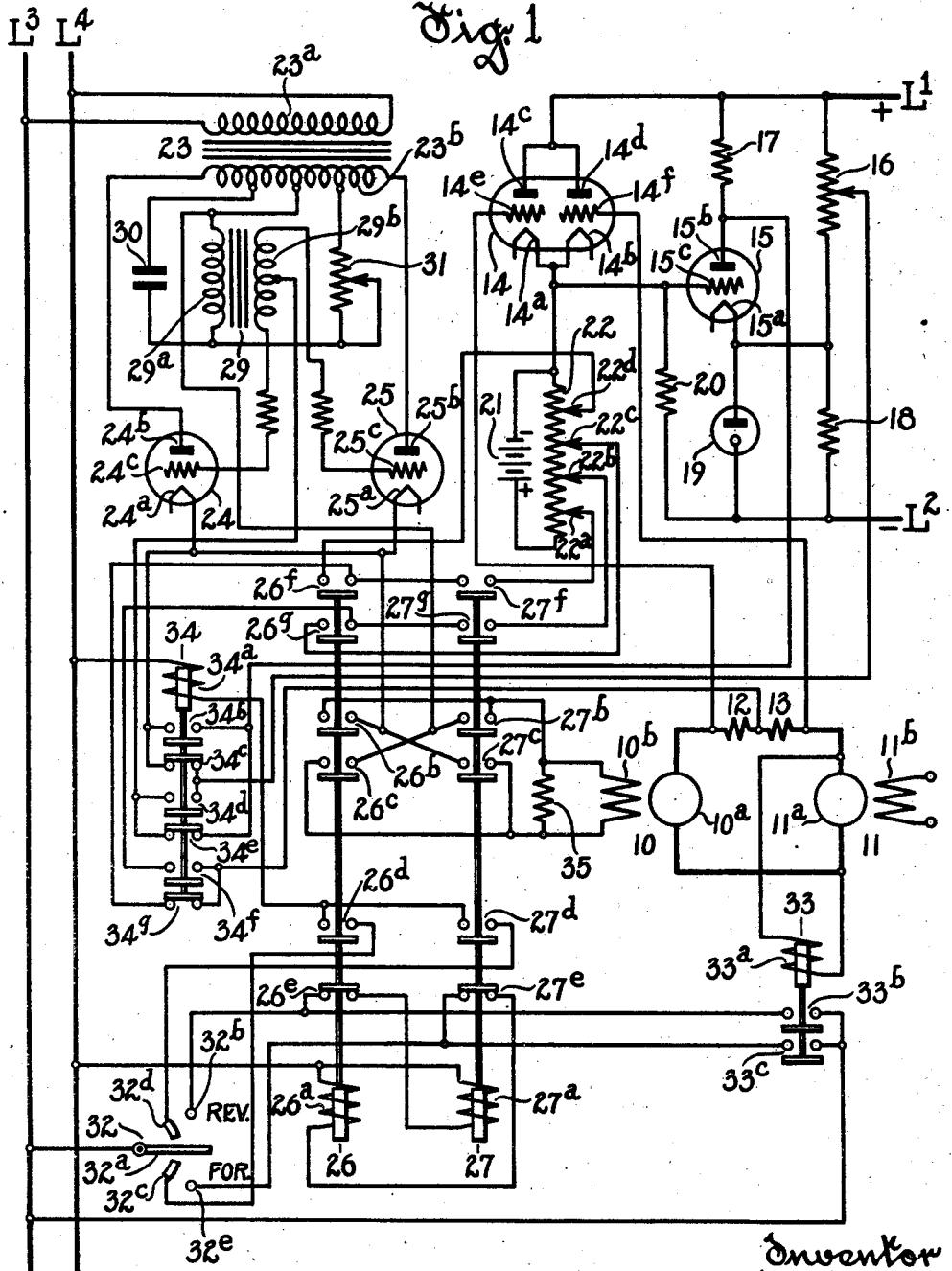

Oct. 15, 1946.　　　　J. B. REEVES　　　　2,409,312
CURRENT REGULATOR
Filed Feb. 5, 1945　　　　2 Sheets-Sheet 1

Inventor
James B. Reeves
By Frank Hubbard
Attorney

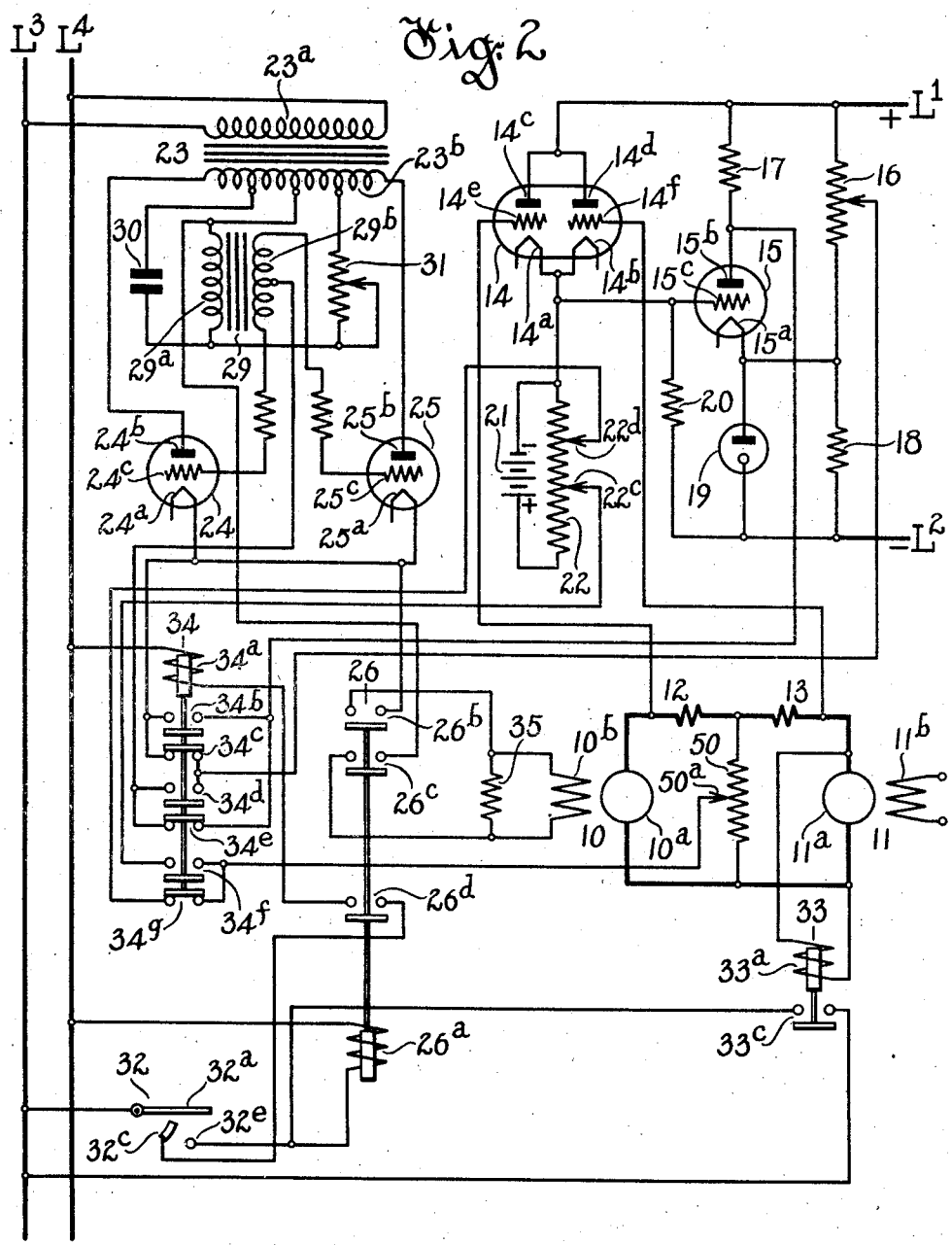

Patented Oct. 15, 1946

2,409,312

UNITED STATES PATENT OFFICE 2,409,312

CURRENT REGULATOR

James B. Reeves, Whitefish Bay, Wis., assignor to Cutler-Hammer, Inc., Milwaukee, Wis., a corporation of Delaware Application February 5, 1945, Serial No. 576,335

6 Claims. (Cl. 172—239)

The invention relates to the current control of dynamo-electric machines or other translating circuits, and while not limited thereto, it is particularly applicable to the control of motors which are supplied with armature current from a variable voltage generator where it is desired to limit the current flowing between the generator and motor upon changes of the motor load or changes of the generator voltage.

An object of the invention is to provide improved means for automatically controlling the armature current of a motor by controlling the field excitation of a generator supplying said armature current.

Another object is to provide in a system of the aforementioned type for limiting through control of the generator excitation the maximum torque tof the motor upon changes of load thereon.

Another object is to provide in a system of the aforementioned type for affording different limits of motor currents for different operating conditions of the motor.

Another object is to provide in a system of the aforementioned type for varying the excitation of the generator so as to maintain a constant motor current upon tendencies of such current to increase.

Another object is to provide for controlling, in a system of the aforementioned type, the accelerating current in response to the motor speed.

Other objects and advantages will hereinafter appear.

The accompanying drawings are illustrative of an embodiment of the invention.

Figure 1 illustrates a system in which a separately excited reversible direct current motor is supplied with energy from a variable voltage generator, while Fig. 2 illustrates a non-reversible system including certain modifications of the control of the generator field.

Referring to Fig. 1, the same illustrates a variable voltage generator 10, having an armature 10$^a$, and a separately excited regulating field winding 10$^b$. The generator supplies current to the armature 11$^a$ of a motor 11 which is also provided with a field winding 11$^b$. The latter may be energized from any suitable direct current source, the energizing current being adjusted to a suitable value. The armatures 10$^a$ and 11$^a$ are connected into a closed loop which includes current shunts 12 and 13 connected in series with each other and with the generator and the motor armature.

The control system comprises two high vacuum electron tubes 14 and 15. The electron tube 14 is a duplex tube, having cathodes 14$^a$ and 14$^b$, anodes 14$^c$ and 14$^d$, respectively, and control electrodes 14$^e$ and 14$^f$, respectively.

The electron tube 15 is provided with a cathode 15$^a$, an anode 15$^b$, and a control electrode 15$^c$. The anodes 14$^c$ and 14$^d$ are jointly connected to a bus bar L$^1$ which constitutes one terminal of a source of direct current of constant potential, the other terminal of said source being a bus bar L$^2$. The cathode 15$^a$ is connected to the bus bar L$^1$, through a voltage divider 16, which is provided with an adjustable contact. The anode 15$^b$ is connected to the bus bar L$^1$, through a resistor 17, while the cathode 15$^a$ is connected to the bus bar L$^2$, through a resistor 18, which is preferably paralleled by a voltage regulating tube 19. The grid 15$^c$ is connected to the two cathodes 14$^a$ and 14$^b$, and is also connected through a resistor 20, to the bus bar L$^2$. The grid 14$^e$ is connected to the terminal of the current shunt 12, which is nearest to the generator, while the grid 14$^f$ is connected to the terminal of the current shunt 13, which is nearest to the motor 11. The cathodes 14$^a$ and 14$^b$ are also connected to the negative terminal of a biasing battery 21, which is paralleled by a voltage divider 22, which is provided with adjustable contacts 22$^a$, 22$^b$, 22$^c$ and 22$^d$.

The field winding 10$^b$ of the generator is supplied with current from the lines L$^3$, L$^4$ of an alternating current source of supply, through a transformer 23, which has a primary winding 23$^a$ and a center tapped secondary winding 23$^b$. The secondary winding is further provided with additional taps on each side of the center tap intermediate between the latter and the end terminals of the winding 23$^b$. Each end terminal of the winding 23$^b$ is connected to one of the anodes 24$^b$ and 25$^b$, respectively, of gaseous electron tubes 24 and 25, respectively, which tubes are also provided with cathodes 24$^a$ and 25$^a$, respectively, and control electrodes 24$^c$ and 25$^c$, respectively. The tubes 24 and 25 are reversibly connectable to the field winding 10$^b$, by a pair of electromagnetic reversing switches 26 and 27, each provided with two normally open main contacts 26$^b$ and 26$^c$, and 27$^b$ and 27$^c$, respectively, normally open auxiliary contacts 26$^d$, 26$^f$, 26$^g$ and 27$^d$, 27$^f$ and 27$^g$, respectively, normally closed auxiliary contacts 26$^e$ and 27$^e$ respectively, and energizing windings 26$^a$ and 27$^a$, respectively. One terminal each of the contacts 26$^b$ and 27$^b$ is jointly connected to one terminal of the winding 10$^b$, the other terminal of which is connected to one terminal of the contacts $26^c$ and $27^c$. The cathodes $24^a$ and $25^a$ are jointly connected to the second terminal of the contacts $26^b$ and $27^c$. The center tap of the winding $23^b$ is connected to the other terminal of contacts $26^c$ and $27^b$ and to one terminal of the primary winding $29^a$ of a transformer 29 which also has a center tapped secondary winding $29^b$. The other terminal of the winding $29^a$ is connected to one intermediate terminal of the winding $23^b$ through a condenser 30 and to the other intermediate terminal of the said winding $23^b$ through a variable resistor 31. The condenser 30, the resistor 31 and the winding $29^a$ form a phase shifting network by means of which the phase angle of the voltage impressed upon the control electrodes of tubes 24 and 25, in relation to the phase angle of the voltage of the lines $L^3$ and $L^4$, may be varied. The control electrodes $24^c$ and $25^c$, respectively, are each connected to one of the end terminals of the secondary winding $29^b$ of the transformer 29.

The windings $26^a$ and $27^a$ may be selectively energized from the line $L^3$ and $L^4$ through a manually operated pilot switch 32, which has a center bias lever $32^a$ operable in one direction to make contact with stationary contacts $32^b$ and $32^d$, and operable in the opposite direction to make contact with stationary contacts $32^c$ and $32^e$.

The pilot switch 32 is preferably so arranged that, upon movement of the lever $32^a$ to the respective operating position, it closes circuit with contacts $32^d$, $32^c$ prior to closure of circuit with contacts $32^b$ or $32^e$.

The energizing winding $33^a$ of an electromagnetic voltage responsive relay 33 is connected across the terminals of the motor armature $11^a$. The relay 33 is also provided with two normally open contacts $33^b$ and $33^c$. One terminal of each of said contacts is connected to the line $L^3$. The second terminal of the contact $33^b$ is connected to the contact $32^b$ while the second terminal of the contact $33^c$ is connected to the contact $32^e$. One terminal each of the windings $26^a$ and $27^a$ is connectable to the line $L^4$. The second terminal of the winding $26^a$ is connectable through the normally closed contacts $27^e$ to the terminal $32^e$, while the second terminal of the winding $27^a$ is connectable through the normally closed contact $26^e$ to the terminal $32^b$.

An electromagnetic relay 34 has an energizing winding $34^a$, one terminal of which is connected to the line $L^4$, while the other terminal is connected to one terminal each of the normally open contacts $26^d$ and $27^d$. The other terminal of contact $26^d$ is connected to contact $32^c$ and the second terminal of contact $27^d$ is connected to contact $32^d$. The relay 34 has normally open contacts $34^b$, $34^d$ and $34^f$, and normally closed contacts $34^c$, $34^e$ and $34^g$. The contacts $34^b$ are interposed in a circuit between the cathodes $24^a$ and $25^a$, and the anode $15^b$. The contacts $34^e$ are interposed in a circuit between the center tap of the winding $29^b$ and the anode $15^b$. The contacts $34^c$ are interposed between the cathodes $24^a$ and $25^a$, and the movable contact of the voltage divider 16; the contacts $34^d$ are interposed between the center tap of the winding $29^b$ and the movable contact of the voltage divider 16; one terminal of contacts $34^f$ and $34^g$ is connected to the common terminal of the shunts 12 and 13; the second terminal of contact $34^f$ is connected to one terminal of each of the contacts $26^g$ and $27^g$, while the second terminal of contact $34^g$ is connected to one terminal of each of the contacts $26^f$ and $27^f$. The second terminal of contacts $26^g$, $27^g$, $26^f$ and $27^f$ is connected to the sliding contacts $22^c$, $22^b$, $22^d$ and $22^a$, respectively.

To start the equipment, the lines $L^1$, $L^2$ and the lines $L^3$ and $L^4$, as well as the motor field $11^b$, are energized and the generator armature is rotated by its prime mover. The energization of the field winding $11^b$ establishes the desired magnetic field in the motor 11, while energization of the lines $L^3$, $L^4$ causes a potential to be impressed by the transformers 23 and 29 upon the anodes of the tubes 24 and 25. A potential is also impressed upon the control electrodes $24^c$ and $25^c$. By adjustment of the resistor 31, the phase relation of the potential impressed upon the anodes $24^b$ and $25^b$, with respect to the phase angle of the voltage impressed upon the control electrodes $24^c$ and $25^c$, and thus the maximum current passed by tubes 24 and 25 to the winding $10^b$, and thus the maximum voltage of the generator 10 may be adjusted.

If it is now desired to operate the motor in a forward direction, the control lever $32^a$ of the control switch 32 is moved to make contact with the stationary contacts $32^c$ and $32^e$, whereupon a circuit is established from line $L^3$, over lever $32^a$, contact $32^e$, contacts $27^e$, through the energizing winding $26^a$ to line $L^4$, and the forward switch 26 is actuated.

Energization of the forward switch 26 completes a circuit from line $L^3$ over contact lever $32^a$, contact $32^c$, contacts $26^d$, coil $34^a$, to line $L^4$, and the relay 34 is actuated to close its contacts $34^b$, $34^d$ and $34^f$, thereby connecting the anode $15^b$ to the cathodes $24^a$ and $25^a$, the movable contact of the voltage divider 16 to the center tap of the transformer winding $29^b$. Closure of contacts $26^b$ and $26^c$ establishes a circuit from one end terminal of winding $23^b$, through tube 24, through contacts $26^b$, winding $10^b$, contacts $26^c$, to the center tap of winding $23^b$, and through said winding back to tube 24, and alternately from the other end terminal of winding $23^b$, through tube 25, contacts $26^b$, winding $10^b$, contacts $26^c$, to the center tap of the winding $23^b$. The generator field $10^b$ is thus supplied with rectified direct current, and a voltage is induced in the generator armature $10^a$ to cause a current flow from said armature through the shunts 12 and 13, the motor armature $11^a$ back to the generator armature $10^a$. As the current supplied to the motor armature $11^a$ accelerates the latter, the terminal voltage of the armature $11^a$ increases until the voltage impressed upon the energizing coil $33^a$ is sufficient to cause closure of the contacts $33^b$ and $33^c$. Closure of these contacts parallels the circuit between the contact arm 32 and the contact $32^e$ so that the lever $32^a$ may be returned to the neutral position to break circuit with the contact $32^e$, but the switch 26 remains energized until the energization of the coil $33^a$ is insufficient to maintain the contacts $33^b$ and $33^c$ closed. The circuit which responds to the voltage drop in the shunts 12 and 13 is so adjusted that when no current flows between the generator and the motor both halves of the tube 14 conduct only a small current. As the current supplied by the generator increases, it produces potential differences in the shunts 12 and 13, which render the grid $14^e$ less positive and the grid $14^f$ more positive with respect to their respective cathodes, so that the potential of the grid $14^e$ is ultimately sufficient to stop current conduction in the left half of the tube 14, whereas the current flowing through the right half of the tube 14 is increased. The relation between the variation of the current in the two halves of the tube 14 and the potential of the grids 14e and 14f may be adjusted in a well known manner by adjustment of the supplemental grid bias afforded by the voltage divider 22.

This supplemental grid bias is equal to the voltage between the adjustable contact of the voltage divider 22, which is connected to the common terminal of the shunts 12 and 13, and the negative terminal of the battery 21. During operation of the motor in the forward direction, that is, while the switch 26 and the relay 34 are energized, a circuit is established from the common terminal of the shunts 12 and 13, through contacts 34f, 26g, and 22c, through part of the voltage divider 22, to the cathodes 14a and 14b. Thus the adjustment of the contact 22c determines the supplemental grid biasing voltage and therefore the relation between the current flowing in the generator-motor loop and the conduction of the two halves of the tube 14, so that upon moving the contact 22c toward the positive terminal of the voltage divider 22, the current conducted by the tube 14 for a given current in the motor-generator loop will be increased.

As the conduction of the right half of the tube 14 increases, the potential of the grid 15c becomes more positive, thereby increasing the conduction of the tube 15 which increases the current in the resistor 17, which in turn reduces the positive potential of the anode 15b. The potential derived from the voltage divider 16 is so adjusted that a desired potential difference exists between the anode 15b and the movable contact of the voltage divider 16. This potential difference is impressed upon the grids 24c and 25c, as will be apparent from the diagram, and is superimposed upon the potential impressed by the winding 29b, the polarity of the superimposed potential being such as to delay the moment of ignition of the tubes 24 and 25, during the respective conducting half cycle, so as to tend to decrease the current supplied to the generator field 10b, to a value which will result in a desired constant current flowing in the generator-motor loop. As a result, the motor is accelerated with a constant torque. Furthermore, after the motor has reached its maximum speed, the current cannot exceed the full load value, such value being adjustable by adjustment of the resistor 22.

If it is now desired to stop the motor, the operator returns the lever 32a to the neutral position. As the voltage impressed on the coil 33a is the maximum terminal voltage of the motor, the relay 33 remains energized, thus maintaining the switch 26 energized, which in turn maintains the connection between the rectifier tubes 24 and 25 and the generator field winding 10b. However, opening the connection between the contact lever 32a and the contact 32c, opens the circuit of the energizing coil 34a, so that the relay 34 opens the contacts 34b and 34d, thereby reversing the connections between the anode 15b and the movable contact of the voltage divider 16 on one hand, and the cathodes 24a and 25a and the center tap of the winding 29b, respectively. As now the action of the generator and motor is reversed, current flows in the motor-generator loop in the reverse direction, so that now the left half of the tube 14 becomes conducting and the right half becomes non-conducting.

During deceleration in the forward rotation of the motor, the contacts 34f are open and contacts 34g are closed. Therefore, the circuit between the contact 22c and the common terminal of the shunts 12 and 13 is opened, while a circuit is closed from said common terminal through contacts 34g and 26f, to contact 22d. Hence, the biasing potential for the tube 14 has been changed so that the system is regulated to afford a decelerating current which is higher or lower than the accelerating current, depending upon the relative position of the contacts 22c and 22d.

However, it is applied to the tubes 24 and 25 in the reverse direction from that during acceleration of the motor 11, thereby advancing the moment of ignition of the respective tube during the positive half cycle and tending to increase the current of the field winding of the generator, to decrease the dynamic braking effect. Thus, the system maintains the braking current of the motor at a constant value which may be substantially the same as the accelerating current, so that the motor is brought to a standstill with the maximum allowable torque and in the shortest possible time. When the motor speed approaches zero, the voltage impressed upon the coil 33a is insufficient to maintain the relay 33 energized. Thus the contacts 33b and 33c are opened, which opens the maintaining circuit for the forward switch coil 26a and causes disconnection of the generator field 10b from the tubes 24 and 25, and the equipment returns to the initial condition.

Operation of the motor in the opposite direction is obvious from the foregoing. To start the motor in reverse direction, the switch arm 32a is moved to make circuit with the contacts 32d and 32b, thereby energizing the reverse switch 27. The functioning of the various elements of the system upon reverse operation will be obvious from the foregoing description and the accompanying drawings. However, it is to be pointed out that since during acceleration upon reverse operation, the contact 22b is connected to the common terminal of the shunts 12 and 13, the position of said contact determines the accelerating current of the motor for reverse rotation. Upon reopening of the pilot switch 32 and during subsequent deceleration, the contact 22a is connected to the common terminal of the shunts 12 and 13, so that the position of the latter contact determines the decelerating current. Hence, during forward operation, the positions of the contacts 22c and 22d determine the current in the motor-generator loop during acceleration and deceleration, respectively, while for reverse operation the positions of the contacts 22b and 22a determine the current in the motor-generator loop during acceleration and deceleration, respectively. Obviously, the controller may be arranged to afford equal accelerating currents for both directions of rotation and equal decelerating current for both directions or equal accelerating and decelerating currents of one value for one direction and of another value for the other direction, or the currents may be adjusted for the same value under all conditions of operation. For certain of said conditions, some of the commutating circuits for the biasing resistor 22 may be combined or omitted, as will be apparent.

Referring now to Fig. 2, the same illustrates a system in which the motor is required to operate only in one direction. However, in the system of Fig. 2, the accelerating current of the motor is controlled in accordance with the speed of the latter so that the rate of acceleration and the motor current are relatively low upon starting and increase progressively as the motor attains speed.

The connections and the elements of the system are substantially the same as illustrated and described in connection with Fig. 1, except for the following: The electromagnetic reversing switch 27 has been omitted; the reverse speed contacts 32$^b$ and 32$^d$ of pilot switch 32 have been omitted; contacts 26$^e$, 26$^f$, 26$^g$ of switch 26, contacts 33$^b$ of switch 33 and sliding contacts 22$^a$, 22$^b$ of voltage divider 22 have been omitted.

A voltage divider 50 has been added, one of its terminals being connected to the positive terminal of the motor, while its other terminal is connected to the common terminal of the shunts 12 and 13. The voltage divider 50 is provided with a movable contact 50$^a$ which is connected to one terminal of each of the contacts 34$^f$ and 34$^g$, while the connection of said contacts to the common terminal of the shunts 12 and 13 has been omitted. Furthermore, the movable contact 22$^d$ is directly connected to the second terminal of contact 34$^g$, while the movable contact 22$^c$ is directly connected to the second terminal of the contact 34$^f$.

The operation of the system is substantially the same as that illustrated in Fig. 1, except that the supplemental voltage existing between the movable contact 50$^a$ and the negative terminal of the voltage divider 50 is added to the bias supplied by the voltage divider 22 to the cathodes 14$^a$ and 14$^b$. Upon starting, the voltage of the generator armature 11$^a$ is substantially zero. Therefore, the bias of the grids 14$^e$ and 14$^f$ with respect to the cathodes 14$^a$ and 14$^b$, respectively, is a minimum. This as has been aforedescribed results in a high impedance of the tubes 24 and 25, so that the exciting current of the generator 10 is relatively low and the motor 11 accelerates with a relatively low torque. As the motor starts to rotate, and its speed increases, the supplemental voltage supplied by the voltage divider 50 progressively increases, thereby reducing the positive bias of the grids 14$^e$ and 14$^f$ with respect to the cathodes 14$^a$ and 14$^b$, respectively, which in turn increases the current passed by the tubes 24 and 25, so as to cause an additional increase of the generator voltage to increase the torque and the acceleration afforded by the motor 11. Hence, at low speeds, the accelerating current and torque of the motor 11 are relatively low, while at higher speeds they are relatively high, the variation being adjustable by adjustment of the sliding contact 50$^a$.

This system is particularly suitable for large centrifugal extractors which must be started at a very low rate in order to prevent undue unbalance of the rotating parts of the extractor. As the extractor accelerates, the parts balance automatically and it is then permissible to increase the rate of acceleration and the accelerating current.

The system shown in Fig. 2 may, of course, also be applied to reversible controllers, and it is furthermore possible to provide for a high rate of acceleration at low speed and a low rate of acceleration at high speed, the changes required for such operation being obvious.

I claim:

1. In combination, a generator, having an armature and a field winding, a pair of electron tubes, each having a control electrode, manual means for establishing connection of said tubes to said field winding for supplying energizing current to the latter, adjustable means including electronic means for impressing a voltage on said control electrodes for regulating the current supplied by said tubes, a motor having an armature connected in circuit with said generator armature, means responsive to the speed of said motor armature for controlling maintenance of said connection of said electron tubes to said field winding independent of said manual means, and means to render said electronic means responsive to the current circulating between said armatures to control and limit such current and including means for predetermining the limit.

2. In combination, a generator, having an armature and a field winding, a pair of electron tubes, each having a control electrode, manual means for establishing connection of said tubes to said field winding for supplying energizing current to the latter, adjustable means including electronic means for impressing a voltage on said control electrodes for regulating the current supplied by said tubes, a motor having an armature connected in circuit with said generator armature, means responsive to the speed of said motor armature for controlling maintenance of said connection of said electron tubes to said field winding independent of said manual means, and means to render said electronic means responsive to the magnitude and direction of current circulating between said armatures to control and limit such current and including means for predetermining different limits for different directions of said circulating current.

3. In combination, a generator, having an armature and a field winding, a pair of electron tubes, each having a control electrode, reversing means including a pilot switch for establishing connection of said tubes to said field winding for supplying energizing current to the latter in opposite directions selectively, adjustable means for impressing a voltage on said control electrodes for regulating the current supplied by said tubes, a motor having an armature connected in circuit with said generator armature, means responsive to the speed of said motor armature for controlling maintenance of said connection of said electron tubes to said field winding independent of said pilot switch, and electronic means responsive to and controlling the current circulating between said armatures for impressing a supplemental voltage on said control electrodes to limit such current, said last named means including means for predetermining the limit.

4. In combination, a generator, having an armature and a field winding, a pair of electron tubes, each having a control electrode, reversing means including a pilot switch for establishing connection of said tubes to said field winding for supplying energizing current to the latter in opposite directions selectively, adjustable means for impressing a voltage on said control electrodes for regulating the current supplied by said tubes, a motor having an armature connected in circuit with said generator armature, means responsive to the speed of said motor armature for controlling maintenance of said connection of said electron tubes to said field winding independent of said pilot switch, and electronic means responsive to and controlling the current circulating between said armatures for impressing a supplemental voltage on said control electrodes to limit such current, said last named means including means for predetermining a plurality of limits, respectively, for different operating conditions.

5. In combination, a generator, having an armature and a field winding, a pair of electron tubes, each having a control electrode, reversing means including a pilot switch for establishing connection of said tube to said field winding for supplying energizing current to the latter in opposite directions selectively, adjustable means for impressing a voltage on said control electrodes for regulating the current supplied by said tubes, a motor having an armature connected in circuit with said generator armature, means responsive to the speed of said motor armature for controlling maintenance of said connection of said electron tubes to said field winding independent of said pilot switch, electronic means for supplying a supplemental voltage varying in accordance with variations of the current circulating between said armatures, means to vary the response of said electronic means to said circulating current, and electromagnetic means controlled by said reversing means and said speed responsive means, for impressing said supplemental voltage upon said control electrodes to limit such circulating current.

6. In combination, a generator, having an armature and a field winding, a pair of electron tubes, each having a control electrode, reversing means including a pilot switch for establishing connection of said tubes to said field winding for supplying energizing current to the latter in opposite directions selectively, adjustable means for impressing a voltage on said control electrodes for regulating the current supplied by said tubes, a motor having an armature connected in circuit with said generator armature, means responsive to the speed of said motor armature for controlling maintenance of said connection of said electron tubes to said field winding independent of said pilot switch, electronic means for supplying a plurality of supplemental voltages varying in accordance with variations of the current circulating between said armatures, means to vary the response of said electronic means to said circulating current, and means including electromagnetic means responsive to said reversing means and said speed responsive means for selectively impressing one of said supplemental voltages upon said control electrodes to limit such circulating current to different values for different operating conditions.

JAMES B. REEVES.